United States Patent [19]

Moody et al.

[11] 4,265,801

[45] May 5, 1981

[54] POLYMERIC BLENDS CONTAINING A MONOORGANIC POLYSILOXANE RESIN

[75] Inventors: Anthony G. Moody, Stratton; Richard J. Penneck, Lechlade, both of England

[73] Assignee: Raychem Limited, London, England

[21] Appl. No.: 925,238

[22] Filed: Jul. 17, 1978

[30] Foreign Application Priority Data

Jul. 27, 1977 [GB] United Kingdom ............... 31608/77

[51] Int. Cl.[3] ...................... C08L 83/06; C08L 67/02; C08L 23/08

[52] U.S. Cl. ............................ 260/40 R; 204/159.13; 260/37 SB; 260/42.26; 525/100; 525/103; 525/105; 525/106; 525/431; 525/446; 525/453; 525/474; 428/447; 428/450

[58] Field of Search ................. 260/824 R, 40, 37 SB, 260/42.26; 525/100, 446, 105, 106, 409, 431, 453, 474

[56] References Cited

U.S. PATENT DOCUMENTS

| | | | |
|---|---|---|---|
| 2,027,962 | 1/1936 | Currie | 264/78 |
| 3,017,386 | 1/1962 | Brown, Jr. et al. | 528/14 |
| 3,086,242 | 4/1963 | Cook et al. | 264/209 |
| 3,120,500 | 2/1964 | Huntington et al. | 528/14 |
| 3,294,709 | 12/1966 | Nitzsche et al. | 525/100 |
| 3,294,738 | 12/1966 | Krantz | 528/11 |
| 3,318,844 | 5/1967 | Krantz | 528/34 |
| 3,355,399 | 11/1967 | Cekada | 525/431 |
| 3,433,764 | 3/1969 | Walmsley | 525/100 |
| 3,489,782 | 1/1970 | Provost et al. | 528/10 |
| 3,716,399 | 2/1973 | Nitzsche et al. | 525/100 |
| 3,749,757 | 7/1973 | Marzocchi | 260/824 |
| 3,784,520 | 1/1974 | Hoeschele | 528/301 |
| 3,801,536 | 4/1974 | Guenantin | 260/40 |
| 3,832,420 | 8/1974 | Clark | 260/825 |
| 3,929,704 | 12/1975 | Horning | 260/825 |
| 4,142,982 | 3/1979 | Yamakami et al. | 260/824 R |

FOREIGN PATENT DOCUMENTS

| | | | |
|---|---|---|---|
| 652685 | 11/1962 | Canada | 525/100 |
| 745706 | 5/1963 | United Kingdom | 260/824 |

*Primary Examiner*—Wilbert J. Briggs, Sr.
*Attorney, Agent, or Firm*—Lyon & Lyon

[57] ABSTRACT

The invention relates to novel melt processable polymer compositions which comprise a blend of non-silicone polymer and a monoorganic polysiloxane resin. Such compositions are useful inter alia as flameproof and moisture resistant coating compositions and in the product of heat shrinkable silicone elastomer compositions.

34 Claims, No Drawings

POLYMERIC BLENDS CONTAINING A MONOORGANIC POLYSILOXANE RESIN

This invention relates to polymeric compositions, and more particularly to compositions comprising a blend of a silicone resin and a non-silicone polymer.

Monoorgano polysiloxane resins are a particularly interesting class of silicone resins which are useful inter alia in flameproof and moisture resistant coating compositions (British Pat. No. 1,312,576) and as hold-out agents for heat shrinkable silicone elastomer compositions having good electrical insulation properties (British Pat. No. 1,409,517). However, for use as wire and cable jacketing materials, the compositions of these prior patents have substantial disadvantages. For example, the coating compositions of British Pat. No. 1,312,576 are thermosetting and thus cannot be melt processed, so that they cannot be extrusion-coated onto a wire or cable conductor. On the other hand, silicone elastomer compositions as described in British Pat. No. 1,409,517, typically have a low oxygen index and poor flame retardance properties, which in many applications, for example in aircraft wiring and harnessing, is highly undesirable.

It is known to blend thermoplastic or elastomeric silicone polymers with thermoplastic or elastomeric non-silicone polymers in the presence of a filler comprising a silane-treated inorganic silicon compound containing the Si-O-Si group (British Pat. No. 1,284,082) but this specification is not concerned with the problem of flame retardancy and does not mention monoorgano polysiloxane resins. Finally, British Pat. No. 1,301,025 describes a baked-on resinous coating consisting essentially of the elevated temperature reaction product of a polytrimellitamideimide or nylon film-forming resin and a linear substantially non-crosslinked organo polysiloxane, but again, the specification does not mention monoorgano polysiloxanes and the oxygen index of the resinous coating is relatively low. The disclosures of these patents are incorporated herein by reference.

There remains, therefore, a need for a polymer composition having improved combustion properties which can be melt processed by conventional means.

According to the present invention there is provided a melt processable polymer composition comprising a blend of a nonsilicone polymer and a monoorgano polysiloxane resin.

Preferred polymer compositions according to the invention have an oxygen index as measured in accordance with the method of ASTM D2863-76 of greater than 25 and most preferably greater than 30. The preferred polymer compositions also have a low smoke emission, preferably having a maximum specific optical density of less than 250, and, most preferably, less than 220, (non-flaming condition) and/or having a maximum specific optical density of less than 150, preferable less than 100 (flaming condition), as measured by ASTM FO7.06 Draft No. 3 "Proposed Test Method for Measuring the Optical Density of Smoke Generated by Solid Materials for Aerospace Applications" using an Aminco-NBS Smoke Density Chamber.

For many applications of the polymer compositions of this invention, for example in aircraft or transportation equipment wiring and harnessing, it is desirable that the polymer composition should not emit noxious vapours when heated, or at least that such vapours should be kept to a minimum. In such applications it is desirable that the polymer compositions should be substantially and preferably completely free of halogen substituents. The invention will accordingly be further described and exemplified primarily in terms of such halogen-free polymer compositions, although it is to be understood that the invention is not limited thereto.

The non-silicone polymer may be an elastomer or a thermoplastic polymer.

Suitable elastomers for use in the present invention include for example polyolefins and olefin copolymers and higher polymers such as ethylene/propylene copolymers, ethylene/propylene/non-conjugated diene terpolymers, polyisobutylene, polynorbornene (Norsorex manufactured by C.d.F), isoprene/isobutylene copolymers, polybutadiene rubbers, polysulphide rubbers; polypropylene oxide rubbers; elastomers having the structure of copolymers and higher polymers of olefinically unsaturated hydrocarbons with unsaturated polar comonomers, for example, copolymers of dienes with ethylenically unsaturated polar monomers such as acrylonitrile, methyl methacrylate, ethyl acrylate, and methyl vinyl ketone; and polyurethanes.

However, the preferred elastomers for use in the present invention are ethylene/acrylic ester polymers or ethylene/vinyl acetate polymers, containing at least 3.6 moles of ethylene per 1000 gms of polymer. Examples of suitable ethylene-containing polymers include:

(a) an ethylene/alkyl acrylate or ethylene/alkyl methacrylate copolymer wherein the alkyl group has 1–4 carbon atoms; the proportion of the acrylic ester being about 2.5–8.0 moles of ester groups per kilogram of the copolymer;

(b) A terpolymer of ethylene with an alkyl acrylate or methacrylate wherein the alkyl group has 1–4 carbon atoms, and a third copolymerizable monomer, which may be, for example, one of the following:

i. a $C_1$–$C_{12}$ alkyl monoester or diester of a butenedioic acid,
ii. acrylic acid,
iii. methacrylic acid,
iv. carbon monoxide,
v. acrylonitrile,
vi. a vinyl ester,
vii. an alkyl acrylate or alkyl methacrylate, the alkyl group having at least five carbon atoms, and
viii. maleic anhydride; or (c) Ethylene/vinyl acetate copolymers containing at least 35% by weight vinyl acetate.

In the above terpolymer the proportion of the acrylic ester is equivalent to about 2.5–8.0 moles of ester groups per kilogram of the polymer, and the proportion of the third monomer is no higher than about 10 weight percent of the polymer.

The ethylene-containing polymer can be a simple polymer of ethylene with methyl acrylate, ethyl acrylate, propyl acrylate, isopropyl acrylate, a butyl acrylate, methyl methacrylate, ethyl methacrylate, propyl methacrylate, isopropyl methacrylate, a butyl methacrylate or vinyl acetate. Such copolymers if not commercially available, can be made by conventional and well known methods. These copolymers should have a melt index within the range of 0.1–70 at 190° C., preferably 0.5–15 as measured by ASTM method D-1238-52T, or the substantially equivalent method, ASTM D-1238-73.

The terpolymer of ethylene with an acrylic ester and a third monomer may contain as the third monomer an ester of fumaric acid or maleic acid, wherein the alcohol moiety can be, for example, methyl, ethyl, propyl, isopropyl, various isomers of butyl, pentyl, hexyl, heptyl, octyl, nonyl, decyl, undecyl, dodecyl, and the like. The third monomer may also be, among others, a vinyl ester such as for example, vinyl acetate or vinyl butyrate. It can also be an acrylic ester such as for example, various isomeric forms of pentyl, hexyl, heptyl, octyl, nonyl, decyl, undecyl, dodecyl, pentadecyl and octadecyl acrylates and methacrylates. It is not practical to use as the third monomer an acrylic ester in which the alcohol moiety contains more than 18 carbon atoms.

Excellent results have been obtained using as the elastomer component of the polymer composition a terpolymer of ethylene, methyl acrylate and a cure-site monomer comprising carboxyl groups available from Du Pont under the trade name Vamac.

Physical properties and other details concerning this material are to be found in a brochure available from Du Pont entitled "Vamac ethylene/acrylic Elastomer—A New Class of Heat and Oil Resistant Rubber" the disclosure of which is incorporated herein by reference.

Suitable thermoplastic polymers for use in the polymer compositions of the present invention include, for example, polyolefins such as polyethylene and polypropylene, polyesters such as polyethyleneterephthalate and polytetramethyleneterephthalate; polyamides such as nylon 6,6, nylon 11 and nylon 12, and modified nylon 11 such as, for example Rislan N manufactured by ATO Chimie; and copolymers of olefins and unsaturated polar monomers for example vinyl acetate, vinyl propionate and higher esters, containing less than 35%, perferably less than 25% by weight of the unsaturated ester. An especially preferred group of thermoplastic polymers are the so-called thermoplastic elastomers, and particularly the segmented copolyester polymers consisting essentially of recurring intralinear long chain ester units and short chain ester units randomly joined head-to-tail through ester linkages, said long chain ester units being represented by the formula:

$$-O-G-O-\overset{\overset{O}{\|}}{C}-R-\overset{\overset{O}{\|}}{C}-$$

and said short chain ester units being represented by the formula:

$$-O-D-O-\overset{\overset{O}{\|}}{C}-R-\overset{\overset{O}{\|}}{C}-$$

where G is a divalent radical remaining after the removal of terminal hydroxyl groups from at least one long chain glycol having a molecular weight of about 600-6000; R is a divalent radical remaining after removal of carboxyl groups from at least one dicarboxylic acid having a molecular weight less than about 300; and D is a divalent radical remaining after removal of hydroxyl groups from at least one low molecular weight diol having a molecular weight less than 250.

Exemplary of the preferred segmented copolyester polymers are the segmented ester copolymers derived from terephthalic acid, polytetramethylene ether glycol and 1,4-butanediol. These are random block copolymers having crystallizable hard blocks with the repeating unit:

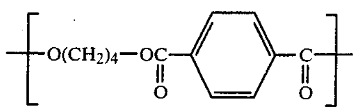

and amorphous, elastomeric polytetramethylene ether terephthalate soft blocks of the repeating unit

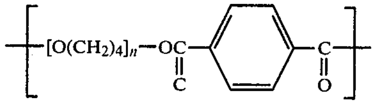

having a molecular weight of from about 600-3000, i.e. n=6-40. Such polymers are commercially available from the Du Pont Co, under the registered trademark "Hytrel". Pertinent information regarding their structure, properties and methods of preparation are to be found in U.S. Pat. Nos. 3,023,192, 3,651,014, 3,763,109, 3,766,146 and 3,784,520 and in Belgian Pat. No. 793,332, the disclosures of which are incorporated herein by reference. Additional information is found in "Segmented Polyether Ester Copolymers, a New Generation of Thermoplastic Elastomers" by G. K. Hoeschele published by the Elastomers Department E. I. Du Pont De Nemours, Inc., Wilmington, Del., and references cited therein all of which are also incorporated by reference. Alternatively there may be used Twinpol, a polyester available from AKZO.

Mixtures of any of the above elastomers or thermoplastic polymers may be used where appropriate.

In this specification the term monoorgano polysiloxane resin refers to a solid resinous non-elastomeric material comprising at least 80%, preferably 90%, most preferably greater than 95%, by weight of polymerised units of the formula $RSiO_{1.5}$ where R is hydrogen or an organic group, at least 85% of the R groups being organic groups.

Usually the monoorgano polysiloxane resins used in the present invention have a softening point in excess of 35° C., preferably in excess of 50° C. and, most preferably, in excess of 70° C. In this specification, softening point is defined as the softening point measured by thermomechanical analysis (TMA), using, for example, a Du Pont TMA 942 instrument.

In this method a flat-sided flake of resin approximately 1 mm thick is placed under a 0.10 inch diameter flat ended probe loaded with a 2 gram weight. The instrument is set at a sensitivity of 2 mil/inch and the sample heated at a rate of 10° C./minute. The softening point is taken as the first deviation from the base-line on the output chart which runs at 10° C./inch for the x axis.

The monoorgano polysiloxane resins useful in the present invention are thermoplastic, that is to say, they can be fabricated at temperatures above their softening point substantially without gelation, to give products which are still substantially organic solvent-soluble and melt processable.

The polysiloxane resins preferably have a number average molecular weight of at least 1000, most preferably in the range of from 2000 to 6000, as measured by vapour pressure osmometry.

Preferably the polysiloxane resins have a low SiOH content, desirably less than 2% by weight as measured by the method described by R. Smith & G. E. Kellum in Anal. Chem 39 (1967) 339. The method involves the rapid condensation of SiOH groups using a boron trifluoride-acetic acid complex catalyst in the presence of pyridine. The resin is dissolved in dry xylene, and pyridine and catalyst added, followed by addition of dry toluene. The solution is aceotropically distilled until all water liberated by the condensation has been collected. The water in the distillate is then determined by Karl Fischer titration. Corrections for traces of water in the solvents are made by performing a blank test. This method gives results which are usually significantly higher than those obtained by other methods such as infrared spectroscopy, but it is believed that the method is more sensitive and gives results which more accurately reflect the total hydroxyl content of the resin.

Preferably there is used in the present invention a thermoplastic monoorgano polysiloxane resin comprising units of the formula $RSiO_{1.5}$ and $R_1R_2R_3SiO_{0.5}$ wherein R, $R_1$, $R_2$ and $R_3$ are hydrogen or organic groups which may be the same or different, at least 85% of the R groups in the $RSiO_{1.5}$ units being organic groups, and at least two of the groups, $R_1$, $R_2$, $R_3$ in each $R_1R_2R_3RSiO_{0.5}$ unit being organic groups, and in which the ratio of $RSiO_{1.5}$ units to $R_1R_2R_3SiO_{0.5}$ units is from 1:0.005 to 1:0.03 on a molar basis, as described in U.S. patent application Ser. No. 927,769 filed on July 25, 1978 by Bonnet et al.

In the unit formula for the monoorgano polysiloxane resin R may be hydrogen or an organic group, provided that at least 85% of the R groups are organic groups. Where R is an organic group, this is preferably a hydrocarbon group, most preferably a methyl or phenyl group. However, other hydrocarbon groups such as alkyl, aryl, aralkyl, alkaryl, alkenyl, cycloalkyl and cycloalkenyl groups may also be used, for example, ethyl, propyl, butyl, vinyl, allyl, tolyl, xylyl, benzyl, cyclohexyl, phenylethyl, and naphthyl groups and substituted hydrocarbon groups, for example halo-substituted hydrocarbon groups, amino-substituted hydrocarbon groups and cyano substituted hydrocarbon groups. The resin may, of course comprise more than one of the groups R listed above if desired.

The groups $R_1$, $R_2$, $R_3$ may be hydrogen, or organic groups which may be the same or different, provided that at least two of the groups $R_1$, $R_2$, $R_3$ are organic groups. Preferably the groups $R_1$ $R_2$ $R_3$ are methyl or phenyl groups, but they may also optionally be one or more of the hydrocarbon groups or substituted hydrocarbon groups as listed above for R.

Although not usually preferred, the monoorgano polysiloxane resin may comprise a minor proportion, that is to say less than 20%, preferably less than 10%, and most preferably less than 5%, by weight of polymerised units of the formula R'R"SiO wherein at least one of the groups R',R" is an organic group. R' and R" may each independently be methyl or phenyl groups, or one or more of the hydrocarbon or substituted hydrocarbon groups as listed above for R. Polysiloxane resins comprising units of the formula $CH_3SiO_{1.5}$ and $(CH_3)_2SiO$ in a molar ratio of from 8:1 to 9.5:1 have been found to be very useful.

The preferred polysiloxane resins for use in the invention comprise only methyl, or only phenyl, or a combination of methyl and phenyl groups. For certain applications, for example where the polysiloxane resin is to be incorporated in a fire retardant composition which is also required to have low smoke emission, it is particularly desirable to use resins in which up to 80% of the groups R are phenyl groups, with the remainder being methyl groups. Particularly good results have been obtained using resins in which the ratio of methyl to phenyl groups on a molar basis is from 1:4 to 43:1.

The monoorgano polysiloxane resins may be produced for example, by hydrolysis of the appropriate monoorgano silane or silanes to form a partially condensed organosiloxane polymer, copolymer or block copolymer resin, followed by reaction with a monofunctional organosiloxane capping agent, as described in U.S. patent application Ser. No. 927,770 filed on July 25, 1978 by Bonnet et al. Suitable hydrolysable monoorganosilanes include organohalosilanes, organoalkoxysilanes, and organocarboxysilanes such as, for example, methyldichlorosilane, methyltrichlorosilane, methyldiisopropoxysilane, methyltriisopropoxysilane, methyldiacetoxysilane, methyltriacetoxysilane, phenyldichlorosilane, phenyltrichlorosilane, phenyldiisopropoxysilane and phenyltriisopropoxysilane. The preferred hydrolysable monoorganosilanes are those of formulae RSi $Cl_3$, RSi $(OAlk)_3$ and RSi $(OCOAlk)_3$ where Alk represents an alkyl group, and R is as previously defined. Mixtures of any of the above hydrolysable monoorganosilanes may be used, and also mixed monoorganohaloalkoxy silanes formed by the addition of an alcohol, and particularly an aliphatic alcohol, for example, methanol, ethanol, propanol, isopropanol, butanol, pentanol, hexanol, or octanol, to a monoorganohalosilane.

Hydrolysis of the monoorganosilane may be effected by adding a solution of the silane in a suitable organic solvent to water, using if necessary a co-solvent for water and the organic solvent to maintain the hydrolysis mixture substantially homogeneous. Suitable organic solvents are, for example, any which are inert to the reactants during the hydrolysis, for example benzene, toluene, xylene, petroleum ether, cyclohexane, chlorinated hydrocarbons, aliphatic and aromatic ethers and n-butylacetate. Suitable co-solvents include, for example, acetone, methyl ethyl ketone, dioxane, tetrahydrofuran, ispropanol and cellosolve. The oragnic solvent is preferably used in an amount of from 0.1 to 1.5 parts by weight, based on the weight of monoorganosilane. The co-solvent if used is preferably mixed with the water, and the organic solvent solution of the silane added thereto. Excess organic solvent may be added to the mixture of water and co-solvent to minimise any possibility of gelation during the reaction. Reaction temperatures are usually maintained at from 0° to 80° C., preferably from 20° to 60° C. After reaction, the aqueous layer is removed, the organic solution neutralised, for example with sodium bicarbonate, and dried.

Alternatively the monoorgano silane may be cohydrolysed with minor amounts of hydrolysable derivatives of phosphorus, boron, titanium, aluminium and tin, for example, halo- or organo-derivatives of these elements. For the purposes of this specification, the term "monoorgano polysiloxane resin" is taken to include such co-hydrolysates.

The partially condensed organosiloxane produced is substantially uncrosslinked, or at least is insufficiently crosslinked to render it insoluble in organic solvents such as, for example, those listed previously. The organosiloxane is partially condensed, that is to say it comprises residual SiOH groups capable of further condensation on heating, or in the presence of a suitable catalyst, to produce a crosslinked infusible material.

The percentage of further condensable SiOH groups is preferably from 1 to 10% by weight, based on the weight of the resin, as measured by the method of Smith & Kellum Anal Chem 39 (1967) 339.

The monofunctional organosilane capping agent is then added, preferably in an amount of from 0.0005 to 0.06 parts, most preferably 0.005 to 0.02 parts, by weight, based on the weight of partially condensed monoorganosiloxane. It is believed that the effect of the capping agent is to react with certain of the SiOH groups in the organosiloxane, which would otherwise be most readily available for condensation reactions. Suitable monofunctional organosilanes include, for example, diorganosilanes and triorganosilanes, especially halo-, alkoxy-, and carboxydiorganosilanes and triorganosilanes, such as, for example, chlorodimethylsilane, chlorotrimethylsilane, chlorodiphenylsilane, chlorotriphenylsilane, isopropoxydimethylsilane, isopropoxytrimethylsilane, isopropoxydiphenylsilane, isopropoxytriphenylsilane, acetoxydimethylsilane, acetoxytrimethylsilane, acetoxydiphenylsilane, acetoxytriphenylsilane; and in general, silanes of the formula $R_1R_2R_3SiCl$, $R_1R_2R_3Si$ (OAlk) or $R_1R_2R_3$*Si (OCOA*lk) where *$R_1$*, $R_2$, $R_3$ and Alk are as previously defined. Mixtures of silane capping agents may be used if desired.

Addition of the silane capping agent is preferably carried out at temperatures of from 20° to 150° C., most preferably from 80° to 120° C. After addition of the capping agent, the resin solution is preferably heated at a temperature of from 60° to 150° C. for a period of from 5 to 120 minutes, most preferably from 30 to 60 minutes, to equilibrate the resin. An equilibration catalyst may be added if desired, for example an acid or alkali, or kieselguhr, but this is not normally necessary as the solution is usually acidic after the capping reaction. After equilibration the resin solution may be washed to neutrality and stripped to yield the solid resin.

The non-silicone polymer and the monoorgano siloxane resin may be blended in a wide range of proportions depending upon the physical requirements of the polymeric compositions. Preferred compositions will however contain the non-silicone polymer and the monorgano siloxane resin in a weight ratio of from 10:1 to 1:3 and most preferably in a weight ratio of from 10:1 to 1:1, especially from 5:1 to 1:1. Particularly good results have been obtained using a blend of an ethylene/acrylic elastomer and a monomethyl siloxane resin in the proportions of from 150 to 250 parts by weight of the ethylene/acrylic elastomer per 100 parts by weight of the monomethyl siloxane.

According to a further aspect of the invention, the polymer composition also comprises an effective amount of a filler giving enhanced fire retardant properties. Suitable fillers include, for example, inorganic metal oxides, hydroxides or salts, or mixtures thereof. Suitable oxides, hydroxides and salts include, for example, alumina, hydrates of alumina, magnesia, hydrates of magnesia, silica, calcium carbonate and barium sulphate. Hydrates of alumina and magnesia are preferred, and in particular, excellent results have been obtained using α-aluminatrihydrate. The filler preferably has a specific surface area of at least 0.1 $m^2/g$, desirably at least 1 $m^2/g$, as measured by the Brunauer, Emmett and Teller (BET) nitrogen absorption method. The filler most preferably has a specific surface area of from about 1 to 80 $m^2/g$ especially 3 to 20 $m^2/g$. The particle size of the filler is preferably less than 5 microns, and most preferably less than 2 microns. If desired the filler may be chemically treated to improve its compatibility with the polymeric materials, for example with one or more substituted silanes having bonded to the or each silicon atom at least one organic group bonding through a Si-C bond as exemplified in British Pat. No. 1,284,082, or with a suitable organotitanium compound, for example, isopropyltriisostearoyl, titanate, tetraisooctyl titanate, and isopropyl diisostearyl methacryl titanate. Additional suitable titanium compounds are described in S. J. Monte & G. Sugerman, J. Elastomers & Plastics Volume 8 (1976) pages 30–49, and in Bulletin KR 0376-4 "Ken-React Titanate Coupling Agents for Filled Polymers" published by Kenrich Petrochem Inc.

The filler is preferably used in an amount of from 10 to 400 parts per 100 parts of non-silicone polymer, most preferably from 50 to 200 parts by weight per 100 parts of non-silicone polymer. Excellent resuts have been obtained using an amount of from 80 to 120 parts by weight of filler per 100 parts of non-silicone polymer.

In addition to the filler the composition of the present invention may comprise additional additives, for example ultra-violet stabilisers, antioxidants, acid acceptors, anti-hydrolysis stabilisers, foaming agents and colourants, in minor proportions.

The non-silicone polymer may be blended with the monoorgano polysiloxane resin in any suitable equipment, for example, a twin roll mill or a Banbury mixer. In general no problems of compatibility of the components have been found to arise, but should these occur it may be advantageous to include a chemically treated filler as described in British Pat. No. 1,284,082.

The polymer compositions of the present invention are melt processable, that is to say they are sufficiently thermoplastic to be processed, for example by injection or compression moulding, or by extrusion, without substantial premature gelation.

The polymer compositions of the present invention may however be crosslinked, if desired, by any convenient method, for example by irradiation or by chemical crosslinking using, for example, a peroxide. Polysiloxane resins having substituents containing olefinically unsaturated groups capable of undergoing crosslinking reactions, especially vinyl and allyl groups, are particularly suitable for crosslinking in this fashion. For most purposes only a minor amount of substituents containing olefinically unsaturated groups is necessary, usually less than 5%, preferably less than 2% on a molar basis. Suitable peroxides are those that decompose rapidly within the range of 150°–250° C. These include, for example, dicumyl peroxide, 2,5-bis(t-butylperoxy) -2,5-dimethylhexane, 2,5-dimethylhexyne and α,α-bis(t-butylperoxy)di-isopropylbenzene. In a typical chemically crosslinkable composition there will be about 0.5–5 parts by weight of peroxide per 100 parts of polymer composition. The peroxide may be adsorbed on an inert carrier such as calcium carbonate, carbon black, or Kieselguhr; however, the weight of the carrier is not included in the above range.

Preferably, however, the polymer compositions of the present invention are crosslinked using high energy radiation. Radiation dose levels to achieve crosslinking according to the present invention are preferably from about 2 to 80 Mrads or more, but a dose of about 5 to 40 Mrads is most preferred. For many purposes a dose of about 8 to 20 Mrads will be effective.

In some cases it may be desirable to add to the crosslinkable polymer composition a co-agent to assist in the crosslinking reaction. Such co-agents usually contain multiple unsaturated groups such as allyl or acrylic esters.

While their mode of action is not known with certainty, it is believed that they react with the initial radical formed on the polymer backbone to form a more stable radical, which undergoes a coupling reaction to form crosslinks more readily than chain scission reactions.

The co-agent can be for example N,N[1]-m(phenylene)-dimaleimide, trimethylolpropane trimethylacrylate, tetraallyloxyethane, triallyl cyanurate, triallyl isocyanurate, tetramethylene glycol diacrylate, or polyethylene oxide glycol dimethylacrylate. The amount of the co-agent is preferably up to about 5 parts by weight per 100 parts of the polymer composition and preferably from 1 to 3 parts by weight per 100 parts of the polymer composition.

Crosslinked polymer compositions according to the present invention may be used in a wide range of applications, and the preferred compositions find particular application where flame retardance and low smoke emission are required.

Thus the compositions may be used in electrical insulation, especially jacketing materials for wire and cable, and as harnessing materials, particularly in automotive and aeronautical applications, cladding for cable conduits and ducting.

Compositions according to the invention may be used for the production of heat recoverable articles for a wide variety of purposes. A heat recoverable article is one which is in a dimensionally heat unstable condition and is capable of altering its physical form upon the application of heat alone to assume a dimensionally heat stable condition. Heat recoverable articles may be produced for example by deforming an article under heat and pressure from an original dimensionally heat stable form to a dimensionally heat unstable form from which it is capable of recovery towards its original form upon the application of heat alone. Heat recoverable articles and methods for their production are described for example in U.S. Pat. Nos. 2,027,962 and 3,086,242.

In another aspect, therefore, the invention provides a heat recoverable article which comprises a polymer composition comprising a blend of a non-silicone polymer and a monoorgano polysiloxane resin.

Heat recoverable articles according to the invention may be used for example, as sleeves for the sealing and protection of splices and terminations in electrical conductors, particularly wires and cables and for providing an environmental seal and protection for repaired areas and joints in utility supply means such as gas and water pipes, district heating systems, ventilation and heating ducts, and conduits or pipes carrying domestic or industrial effluent.

The invention is illustrated by the following Examples in which the oxygen index is measured in accordance with ASTM D2863-76 and the smoke emission of the samples is measured as described below:

SMOKE EMISSION TEST ASTM FO7.06 DRAFT NO. 3

This method for measuring the smoke generated by materials employs an electrically heated radiant energy source mounted within an insulated ceramic tube and positioned so as to produce an irradiance level of 2.2 Btu/Sec $ft^2$ (2.5 $W/cm^2$) averaged over the central 38.1 mm diameter area of a vertically mounted specimen facing the radiant heater. The specimen is mounted within a holder which exposes an area measuring 65.1 mm×65.1 mm. This exposure provides the non-flaming condition of the test. For the flaming condition, a multidirectional six-tube burner is used to apply premixed airpropane flamelets to flat specimens. For an insulated conductor a straight six-tube burner is used in place of the multidirectional burner. This application of flame in addition to the specified irradiance level from the heating element constitutes the flaming condition exposure. The test specimens are exposed to the flaming and non-flaming conditions within a closed 0.51 $m^33$ chamber (Aminco-NBS smoke density chamber). A photometric system with a 914 mm vertical light path measures the continuous decrease in light transmission as smoke accumulates. The light transmittance measurements are used to express the obscuration due to the smoke generated in terms of the specific optical density at fixed time intervals during the time period to reach maximum specific optical density. Optical density is defined as the logarithm of the quotient of the incident light flux divided by the transmitted light flux. A detailed discussion of the concept of specific optical density and smoke obscuration index is contained in "Method for Measuring Smoke from Burning Materials" by D. Gross, J. J. Loftus and A. F. Robertson, ASTM Technical Publication No. 422 (1967).

EXAMPLE 1

The following materials were blended together in a Banbury mixer at a temperature of 120° C. for a period of 4 minutes.

| | I | II | III |
|---|---|---|---|
| Hytrel 4055 | 60 | — | 30 |
| VAMAC N123 | 123 | 123 | 123 |
| α-alumina trihydrate (Hydral 705) | 120 | 120 | 120 |
| Monomethyl vinylphenyl polysiloxane resin (25% methyl, 3% vinyl, 72% phenyl) TMA softening point 107° C. OH content 1.18%, molecular weight (number average) 2,800 | — | 60 | 30 |
| Armeen 1HT (processing aid) | 3 | 3 | 3 |
| Triallylcyanurate | 4 | 4 | 4 |

The blended materials were then moulded in plaques and irradiated to an absorbed dose of 12 Mrads. The limiting oxygen index of the plaques was then measured in accordance with ASTM D2836-76. The results were as follows:

| | | | |
|---|---|---|---|
| Limiting oxygen index | 28 | 34 | 31 |

These results show the improvement in limiting oxygen index obtained using a monoorgano polysiloxane resin in accordance with the invention by comparison with a similar composition from which the resin is omitted.

EXAMPLE 2

The procedure of Example 1 was repeated using the compositions listed below, and their limiting oxygen index measured as before:

| | IV | V | VI | VII |
|---|---|---|---|---|
| Monomethylphenyl polysiloxane resin (c. 29% methyl, c.71% | | | | |

-continued

| | IV | V | VI | VII |
|---|---|---|---|---|
| phenyl) TMA softening point 110° C., OH content 4.4% | 60 | 60 | 60 | — |
| Monomethylvinyl polysiloxane resin (94.6% methyl, 5.4% vinyl) TMA softening point 37° C. OH content 0.97% | — | — | — | 60 |
| VAMAC N123 | 123 | 123 | 123 | 123 |
| Silane A172-coated α-alumina trihydrate | 120 | 140 | 160 | 140 |
| Armeen 1HT (Processing aid) | 3 | 3 | 3 | 3 |
| Triallyl cyanurate | 4 | 4 | 4 | 4 |
| Limiting oxygen index | 32 | 34.5 | 37.5 | 39 |

These results show the improvement obtained using increasing quantities of α-alumina trihydrate, and that outstanding results are obtained using a monomethyl siloxane resin.

EXAMPLE 3

The procedure of Example 1 was repeated using the compositions listed below. The limiting oxygen index and specific optical density of the compositions were measured in accordance with ASTM D2863-76 and ASTM FO7.06 Draft No. 3, respectively.

| | VIII | IX | X | XI | XII | XIII |
|---|---|---|---|---|---|---|
| Vamac N123 | 120 | 120 | 120 | 120 | 120 | 120 |
| Hytrel 4055 | 60 | 60 | 60 | — | 60 | — |
| Rilsan N | — | — | — | 60 | — | 60 |
| Monomethylvinyl polysiloxane resin (94.6% methyl 5.4% vinyl) (TMA softening point 37° C., OH content 0.97%) | — | — | — | — | 60 | 30 |
| Hisil 233 silica filler | — | — | 60 | — | — | — |
| Organophyllosilicate resin (S179 manufactured by Pilot Chem. Co.) | — | — | — | 30 | — | — |
| α-alumina trihydrate (Hydral 705) | — | 60 | — | 30 | — | 30 |
| Triallyl cyanurate | 4 | 4 | 4 | 4 | 4 | 4 |
| Limiting oxygen index | 18.9 | 23.1 | 21.7 | 22.9 | 23.3 | 23.8 |
| Maximum specific optical density (non-flaming condition) | 357 | 236 | 221 | 221 | 302 | 216 |

Examples VIII, IX, X and XII show that the improvement in limiting oxygen index obtained using the monomethyl polysiloxane resin alone is significantly and surprisingly greater than that obtained using α-alumina trihydrate, a silica filler, or an organosilicate resin. Examples XI and XIII also show that the monomethyl polysiloxane resin gives an improvement over the organosilicate resin, even in the presence of the α-alumina trihydrate filler.

EXAMPLE 4

This Example describes a comparison of the properties of a composition according to the invention and a similar composition containing a silicone elastomer in place of the monoorgano polysiloxane resin.

Compositions comprising 40 parts by weight of Vamac N123 ethylene/acrylic elastomer (Du Pont), 38 parts by weight of α-alumina trihydrate, 10 parts by weight of Hytrel 4055 segmented copolyester (Du Pont), 9.5 parts by weight of either (i) a monomethyl-monophenyl polysiloxane resin having a methyl:phenyl molar ratio of 34:66 and a softening point of 98° C., or (ii) a methyl/phenyl silicone elastomer E315-70 supplied by ICI, and 2.5 parts by weight of processing aid were mixed in a Banbury mixer for 5 minutes at a temperature of from 70° to 140° C. Plaques of thickness 3.25 mm were moulded, irradiated to 12 Mrads and evaluated in the NBS smoke chamber. Values for maximum specific optical density (flaming mode) of 65 for the monomethyl monophenyl polysiloxane resin composition, and 121 for the silicone elastomer composition were obtained. These results show the large and unexpected improvement in smoke emission obtained using compositions according to the present invention.

EXAMPLE 5

This Example shows the effect of varying the ratio of methyl to phenyl substituents on the properties of the polysiloxane resin containing compositions according to the invention.

Compositions comprising 100 parts by weight of polyethylene, 120 parts by weight of α-alumina trihydrate and 30 parts by weight of monoorgano polysiloxane resin were mixed uniformly on rollers heated to 120°-140° C. and moulded in a press. For comparison purposes a composition omitting the monoorgano polysiloxane resin was also prepared.

The compositions were tested in the NBS smoke chamber for smoke emission characteristics and the results obtained are given below:

Monoorgano polysiloxane resin

| % Methyl (molar basis) | % Phenyl (molar basis) | Smoke Obscuration Index (flaming mode) |
|---|---|---|
| 0 | 100 | 10.9 |
| 25 | 75 | 1.66 |
| 33 | 67 | 0.88 |
| 50 | 50 | 6.07 |
| 75 | 25 | 12.7 |
| 100 | 0 | 3.66 |
| no resin | | 24.2 |

These results show the improvement obtained using the compositions according to the invention, and the additional improvement obtained by appropriate selection of the methyl:phenyl ratio.

EXAMPLE 6

Compositions containing 40 parts by weight of Vamac N123 ethylene/acrylic elastomer (Du Pont), 38 parts by weight of silane treated α-alumina trihydrate, 10 parts by weight of Hytrel segmented copolyester (Du Pont) 2.5 parts by weight of processing aids and 9.5 parts by weight of either (i) a monomethyl dimethyl polysiloxane resin containing ~10 mole % dimethyl siloxane units having a TMA softening point of 45° C. or (ii) a monomethyl dimethyl polysiloxane resin containing ~15 mole % dimethyl siloxane units having a TMA softening point of 50° C. or (iii) a monomethyl monophenyl dimethyl polysiloxane resin containing 10 mole % of monomethyl siloxane units, 75 mole % monophenyl siloxane units and 15 mole % dimethyl siloxane units were mixed in a Banbury mixed for 5 minutes at a temperature of 70°-140° C. Plaques of thickness 3.25 mm were moulded and irradiated to 12 Mrad. The plaques were tested in the NBS smoke chamber. Values for maximum specific optical density (Dmax) in the flaming condition are given below:

| Formulation | (i) | (ii) | (iii) |
|---|---|---|---|

-continued

| | | | |
|---|---|---|---|
| Dmax | 82 | 91 | 116 |

EXAMPLE 7

A monomethyl monophenyl polyxiloane resin containing a molar ratio of methyl:phenyl groups of 34:66 and having a softening point of 103° C. was blended with various polymers and silane treated α-alumina trihydrate in the following proportions

| | I | II | III | IV |
|---|---|---|---|---|
| Vamac N123 | 100 | | | |
| Ethylene/ethyl acrylate copolymer | | 100 | | |
| Polyethylene | | | 100 | |
| Hytrel 4055 | | | | 100 |
| α-alumina trihydrate | 120 | 120 | 120 | 30 |
| Polysiloxane resin | 30 | 30 | 30 | 30 |

Plaques 3.25 mm thick were moulded and evaluated in the NBS smoke chamber. The values for maximum specific optical density (Dmax) in the flaming mode are given below:

| Formulation | I | II | III | IV |
|---|---|---|---|---|
| Dmax | 43 | 80 | 87 | 127 |

What is claimed is:

1. A flame retarded, melt processable polymer composition, comprising a blend of (a) non-silicone polymer that is an elastomer or a thermoplastic polymer, (b) solid, non-elastomeric, monoorganic polysiloxane resin comprising at least 80% by weight of polymerized units of the formula $RSiO_{1.5}$ where R is hydrogen or an organic group, at least 85% of the R groups being organic groups, the non-silicone polymer and the monorganic siloxane resin being present in a weight ratio of from 10:1 to 1:1, wherein the monoorganic polysiloxane resin has a number average molecular weight in the range of from 2000 to 6000 and a hydroxyl content of less than 2% by weight, and (c) an effective amount of filler providing enhanced fire retardant properties.

2. The composition of claim 1, having an oxygen index greater than 25 as measured by the method of ASTM D2863-76.

3. The composition of claim 1, having a maximum specific optical density of less than 250 (non-flaming condition) as measured by the method of ASTM FO7.06 Draft No. 3.

4. The composition of claim 1, having a maximum specific optical density of less than 150 (flaming condition) as measured by the method of ASTM FO7.06 Draft No. 3.

5. The composition of claim 1, in which the polymer and the resin are substantially free of halogen substituents.

6. The composition of claim 1, in which the non-silicone polymer comprises a thermoplastic polymer comprising a polyolefin, a polyester, a polyamide, or a copolymer of an olefin and an unsaturated ester containing less then 35% by weight of the unsaturated ester.

7. The composition of claim 6, in which the thermoplastic polymer comprises a segmented copolyester polymer consisting essentially of recurring intralinear long chain ester units and short chain ester units randomly joined head-to-tail through ester linkages, said long chain ester units being represented by the formula:

$$-O-G-O-\overset{\overset{O}{\|}}{C}-R-\overset{\overset{O}{\|}}{C}-$$

and said short chain ester units being represented by the formula:

$$-O-D-O-\overset{\overset{O}{\|}}{C}-R-\overset{\overset{O}{\|}}{C}-$$

where G is a divalent radical remaining after the removal of terminal hydroxyl groups from at least one long chain glycol having a molecular weight of from 600 to 6000; R is a divalent radical remaining after removal of carboxyl groups from at least one dicarboxylic acid having a molecular weight of less than 300; and D is a divalent radical remaining after removal of hydroxyl groups from at least one low molecular weight diol having a molecular weight of less than 250.

8. The composition of claim 7, in which the thermoplastic polymer comprises a segmented polyether ester copolymer derived from terephthalic acid, polytetramethylene ether glycol and 1,4-butanediol, having the repeating units

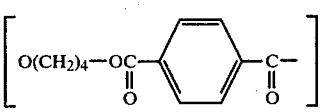

and

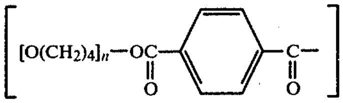

in which n=6 to 40.

9. The composition of claim 1, in which the monoorganic polysiloxane resin has a softening point in excess of 50° C. as measured by thermomechanical analysis.

10. The composition of claim 1, in which the monoorgano polysiloxane resin comprises units of the formula $R_1R_2R_3SiO_{0.5}$ wherein $R_1$, $R_2$ and $R_3$ are hydrogen, or organic groups which may be the same or different, at least two of the groups $R_1$, $R_2$ and $R_3$ in each $R_1R_2R_3SiO_{0.5}$ unit being organic groups, and in which the ratio of $RSiO_{1.5}$ units to $R_1R_2R_3SiO_{0.5}$ units is from 1:0.005 to 1:0.03 on a molar basis.

11. The composition of claim 10, in which R is a hydrocarbon group or a substituted hydrocarbon group.

12. The composition of claim 11, in which R is a methyl or phenyl group.

13. The composition of claim 10 in which $R_1$, $R_2$ and $R_3$ are unsubstituted or substituted hydrocarbon groups.

14. The composition of claim 13, in which $R_1$, $R_2$ and $R_3$ are each a methyl or a phenyl group.

15. The composition of claim 10, in which up to 80% of the groups R are phenyl groups, with the remainder being methyl groups.

16. The composition of claim 12, in which the ratio of methyl to phenyl groups on a molar basis is from 1:3 to 3.1.

17. The composition of claim 1, in which the monoorgano siloxane resin comprises units of the formula $CH_3SiO_{1.5}$ and $(CH_3)_2SiO$ in the molar ratio of from 8:1 to 9.5:1.

18. The composition of claim 1, in which the filler comprises a metal oxide, hydroxide or salt, or a mixture thereof.

19. The composition of claim 1, in which the filler comprises a hydrate of alumina.

20. The composition of claim 19, in which the filler comprises α-alumina trihydrate.

21. The composition of claim 1, in which the filler has a specific surface area of at least 1 $m^2/g$.

22. The composition of claim 1, in which the filler has a surface area of from 1 to 80 $m^2/g$.

23. The composition of claim 1, in which the filler is present in an amount of from 10 to 400 parts by weight per 100 parts by weight of non-silicone polymer.

24. The composition of claim 1, in which the filler is present in an amount of from 80 to 120 parts by weight per 100 parts by weight of non-silicone polymer.

25. The composition of claim 1, that has been crosslinked.

26. The composition of claim 1, in which the monoorgano polysiloxane resin comprises substituents comprising olefinically unsaturated groups capable of undergoing crosslinking reactions.

27. The composition of claim 25, in which the crosslinking has been carried out by irradiation.

28. Electrical insulation comprising a polymer composition of claim 1.

29. An article which is heat recoverable, which can be rendered heat recoverable, or which is heat recovered, which comprises the polymer composition of claim 1.

30. Electrical wire or cable provided with the insulation of claim 28.

31. The composition of claim 1, in which the non-silicone polymer is an elastomer selected from the group consisting of a polyolefin, an olefin copolymer, and a higher olefin polymer.

32. The composition of claim 1, in which the non-silicone polymer is an elastomer selected from the group consisting of an ethylene/acrylic ester polymer containing at least 3.6 moles of ethylene per 1000 gms of polymer and an ethylene vinyl acetate polymer, containing at least 3.6 moles of ethylene per 1000 gms of polymer.

33. The composition of claim 32, in which the elastomer is selected from:

(a) an ethylene/alkyl acrylate or ethylene/alkyl methacrylate copolymer wherein the alkyl group has 1 to 4 carbon atoms, the proportion of the acrylic ester being equivalent to from 2.4 to 8.0 moles of ester groups per 1000 gms of the copolymer;

(b) a terpolymer of ethylene with an alkyl acrylate or methacrylate wherein the alkyl group has from 1 to 4 carbon atoms, and a third copolymerizable monomer selected from:
   (i) a $C_1$–$C_{12}$ alkyl monoester or diester of a butenedioic acid
   (ii) acrylic acid
   (iii) methacrylic acid
   (iv) carbon monoxide
   (v) acrylonitrile
   (vi) a vinyl ester
   (vii) an alkyl or alkyl methacrylate, the alkyl group having at least 5 carbon atoms
   (viii) maleic anhydride the proportion of the acrylic ester being equivalent to from 2.5 to 8.0 moles of ester groups per 1000 gms of the polymer, and the proportion of the third monomer being not higher than 10 weight percent of the polymer, and (c) an ethylene/vinyl acetate copolymer containing at least 35% by weight vinyl acetate.

34. The composition of claim 33, in which the elastomer comprises a terpolymer or ethylene, methyl acrylate and cure-site monomer comprising carboxyl groups.

* * * * *